(12) United States Patent
Ebbo et al.

(10) Patent No.: US 7,536,390 B2
(45) Date of Patent: May 19, 2009

(54) ACCESSING WEB CONTENT FROM ANY VIRTUALIZED STORE

(75) Inventors: David Ebbo, Redmond, WA (US);
Dmitry Robsman, Bellevue, WA (US);
Qing Ye, Bellevue, WA (US); Erik Olson, Sammamish, WA (US); Roger Grambihler, Woodinville, WA (US);
Simon Calvert, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 11/078,535

(22) Filed: Mar. 11, 2005

(65) Prior Publication Data
US 2006/0206452 A1 Sep. 14, 2006

(51) Int. Cl.
G06F 7/00 (2006.01)
G06F 17/30 (2006.01)
(52) U.S. Cl. ...................................................... 707/10
(58) Field of Classification Search .................. None
See application file for complete search history.

(56) References Cited

U.S. PATENT DOCUMENTS

| | | | |
|---|---|---|---|
| 5,761,673 A * | 6/1998 | Bookman et al. | 719/311 |
| 5,937,406 A * | 8/1999 | Balabine et al. | 707/100 |
| 5,991,809 A * | 11/1999 | Kriegsman | 709/226 |
| 6,289,358 B1 * | 9/2001 | Mattis et al. | 707/203 |
| 6,324,565 B1 * | 11/2001 | Holt, III | 709/203 |
| 6,591,295 B1 * | 7/2003 | Diamond et al. | 709/217 |
| 6,901,403 B1 * | 5/2005 | Bata et al. | 707/101 |
| 2001/0034733 A1 * | 10/2001 | Prompt et al. | 707/102 |
| 2002/0133491 A1 * | 9/2002 | Sim et al. | 707/10 |
| 2005/0149552 A1 * | 7/2005 | Chan et al. | 707/102 |

OTHER PUBLICATIONS

Buser et al. "Beginning Active Server Pages 3.0", 1999, Wrox Press Ltd, pp. 18, 19, 24, 70, 71, 272-273, 371, 464-469, 474-483, 570.*

* cited by examiner

*Primary Examiner*—James E. Richardson
(74) *Attorney, Agent, or Firm*—Workman Nydegger

(57) ABSTRACT

A virtual path provider allows a Web application to access content source that is maintained by a file system, and/or content source that is maintained separately from a file system. When the Web application receives a request for processed content from a requesting computer system, the Web application access the processed content in cache if there is a valid cache entry, or accesses the corresponding content source through a virtual path provider. If appropriate for the content source, the virtual path provider streams the content source to the Web application through a virtual path. In one implementation, the virtual path provider provides a hash value of the content source, which can be compared to a cache entry. Implementations of the present invention, therefore, allow content source from any virtual store at any location to be processed or compiled by a Web application.

18 Claims, 3 Drawing Sheets

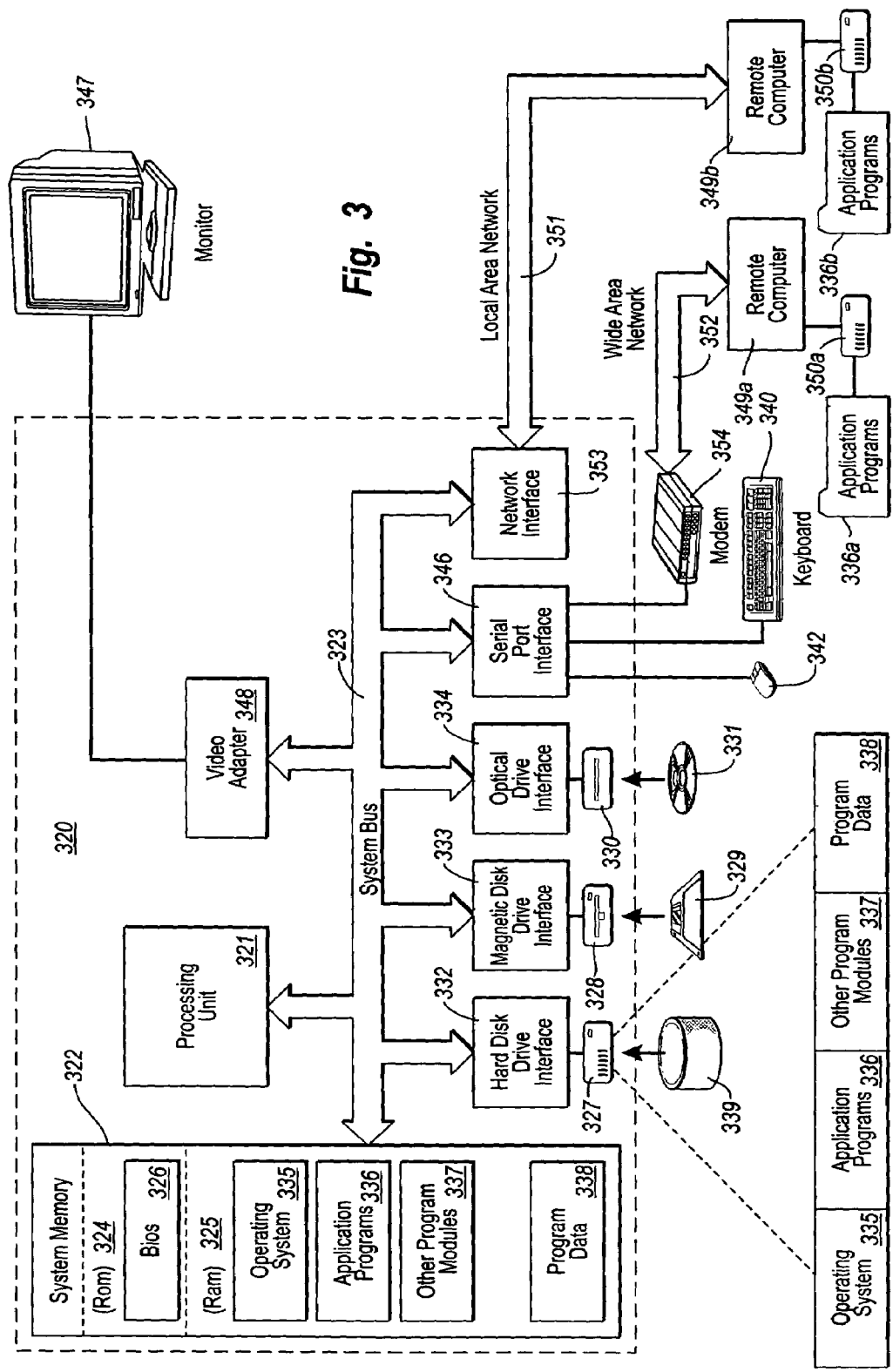

ACCESSING WEB CONTENT FROM ANY VIRTUALIZED STORE

CROSS-REFERENCE TO RELATED APPLICATIONS

N/A

BACKGROUND OF THE INVENTION

1. The Field of the Invention

This invention relates to systems, methods, and computer program products for accessing content over a network from any store, such as content in a store that is maintained separately from a file system.

2. Background and Relevant Art

As computerized systems have increased in popularity, so also have the needs to distribute files and processing resources of computer systems in networks both large and small. In general, computer systems and related devices share information over a network for a variety of reasons, whether, for example, to simply exchange personal electronic messages, to sell merchandise, provide account information, and so forth. One will appreciate, however, that as computer systems have become increasingly more sophisticated for individual use, the challenges associated with sharing data and resources on a network have also increased.

Generally, when accessing content over the web, a requesting computer sends a request message to a Web server for certain content. The request may occur as a result of selecting an Internet hyperlink for a uniform resource identifier ("URI") through a web browser. In general, the conventional syntax for the URI request involves a host name, and a relative path to the file. The virtual path is the string of directories found in the URI after the host name has been identified. For example, in the case of a URI such as "www.host.com/dir1/dir2/file.htm", "www.host.com" represents a resolvable domain name for the host, and the portion of the URI that is "/dir1/dir2/" represents the virtual path in the host's file system to the contents of "file.htm".

In the simple case of the URI, the requested content ("file.htm") may be based on content source found ultimately on the Web server's file system, such as the text of one or more Internet web pages (i.e., "file.htm" is a simple HTML web page) stored in a web directory on the file system. To provide a response to the request for content, the Web server identifies content source on the relevant directory (e.g., at "web server directory/dir1/dir2/"). The Web server may then process the content source before sending the content back to the requesting computer. In other cases, the file identified in the URI may include referrals to content source that is not necessarily found on the Web server's (or other relevant computer's) conventional file system. For example, the web form may contain a reference to remote database content source, or to some other content source that is maintained separately from the file system.

Unfortunately, it can be fairly complicated for the Web server and/or application when accessing non-file-system content source, such as, for example, in the case of database content source. Generally, the content source cannot ordinarily be accessed by simply typing in a host name and subsequent virtual path to content source outside of the file system. This problem can be particularly acute for web pages at a Web server in distributed environments, such as when using web forms that refer to non-file-system content source. For example, the Web server handling the request for such a web form may have to request the referred-to content source from the relevant application files by using one or more interfaces or scripts to query the application. The Web server could then copy the retrieved content source to the Web server's file system from a location that is maintained separately from the file system, and, in some cases, generate some source code that will be compiled. The Web server would then process the copied contents as appropriate before passing the processed content on to the requesting computer system. As such, one can appreciate that accessing non-file-system content source can be particularly difficult. Similarly, it can be complicated from a development stand point to write scripts or interface files that are used by a given Web server to access content source that is maintained separately from a file system.

Accordingly, an advantage in the art can be realized with systems, methods, and computer program products that allow developers to maintain the content of application file content source separately from the file system where appropriate, without unduly complicating retrieval requirements of such content. In particular, an advantage in the art can be realized with systems, methods, and computer program products that provide a Web server with the ability to access non-file-system content source in a manner similar in simplicity to accessing content source on a file system.

BRIEF SUMMARY OF THE INVENTION

The present invention solves one or more problems in the prior art with systems, methods, and computer program products that provide a Web application on a Web server with the ability to access content source in any virtual store through a virtual path provider. In particular, implementations of the present invention include a virtual path provider associated with one or more applications, the virtual path provider being configured to provide access to content source that is part of a file system or maintained separately from a file system.

For example, in accordance with at least one implementation of the present invention, a method from the perspective of a Web application on a Web server involves receiving a request for content that is based at least in part on content source that is maintained separately from a file system. For example, a network computer requests content of one or more files on the Web server, where the content of one of the files is based on content source that is maintained separately from the file system. The Web application then determines that a virtual path provider is required for access to the requested content. Based on a determination by the virtual path provider, the Web application then receives a stream of the content source from the virtual path provider, or accesses a valid cache entry of a processed version of the content source.

From the virtual path provider perspective, one method for providing access to content source in a virtual store involves receiving a request from a Web application for content that is based at least in part on content source that is maintained separately from the file system. Based on the request, the virtual path provider may also determine whether the virtual path provider is appropriate for providing the portion of content. For example, the virtual path provider may prefer to hand off the request to another virtual path provider if the virtual path provider does not have the requested content source. The method from the virtual path provider perspective also comprises determining a hash value of the content source, which can be provided to the Web application to access a cache entry if appropriate. If appropriate, the virtual path provider can also stream the content source through the virtual path to the Web application if there is no valid cache entry.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a schematic block diagram of a suitable computing environment for practicing one or more implementations in accordance with the present invention.

DETAILED DESCRIPTION OF THE PREFERRED EMBODIMENTS

The present invention extends to systems, methods, and computer program products that provide a Web application on a Web server with the ability to access content source in any virtual store through a virtual path provider. In particular, implementations of the present invention include a virtual path provider associated with one or more applications, the virtual path provider being configured to provide access to content source that is part of a file system or maintained separately from a file system.

For example, at least one aspect of the invention provides an application developer with the ability to maintain files associated with an application separate from any file system on which the application will reside. Another aspect of the invention includes use of a virtual path provider, which allows a Web application to access files that are part of a file system in a similar manner as how those files are accessed that are not part of a file system. In particular, a virtual path provider can treat files that are maintained separately from the file system in a manner as though they were part of the main file system, such that those files maintained separately from the main file system are treated as a separate type of file system. Thus, in one aspect of the invention, the virtual path provider can provide a layer of abstraction between a Web application and at least some file content.

Figure 1:
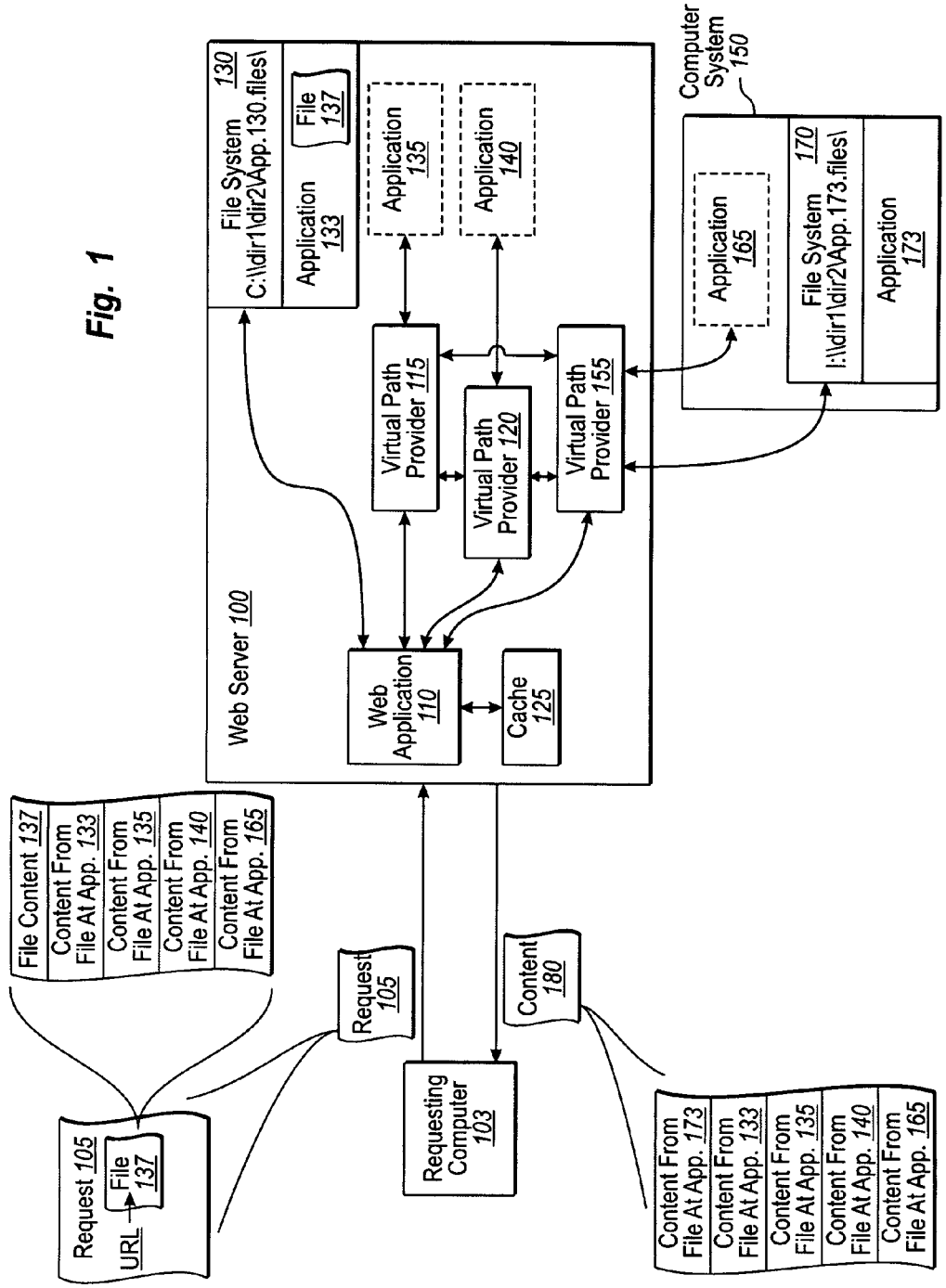
FIG. 1 illustrates a schematic overview of an implementation of the present invention in which a Web application provides to a requesting computer content that is part of the file system, and content that is not part of the file system with the aid of a virtual path provider.

FIG. 1 provides a schematic overview of an implementation of the present invention in which a Web application directly accesses content source maintained by the file system, and utilizes a virtual path provider to access content source that is maintained separately from the file system. One will appreciate, however, after reading the present specification and claims that a virtual path provider can also be used to provide content source that is maintained by the file system on the Web server, or at a file system of another computer system on a network.

In any event, FIG. 1 shows that a Web application 110 at a Web server 100 has access to a file system 130, such as application 133 files found at, for example, the directory "c:\dir1\dir2\App.130.files\". File system files for which the Web application 110 has access, however, do not necessarily need to be installed on the same computer 100 as the Web application 110. For example, FIG. 1 shows that the Web application has access through virtual path provider 155 to file system content source and non-file system content source at another computer system 150, such as another server on the same local network as the Web server 100 resides. As such, the Web application 110 has access to the file system 170 "content source" found in any number of places. In particular, FIG. 1 shows that Web application 110 has access to application 173 files found at the file system 170 directory "I:\dir1\dir2\App.173.files\" on computer system 150, as well as in file system 130 directory "C:\dir1\dir2\App.130.files\".

By way of explanation, the term "content" will be generally distinguished in the present description and claims with respect to "content source" as applied to one or more contexts. In general, a request for "content", such as request 105, will be based primarily on information that can be passed on to the requesting computer system 103, such that "content" is a processed version of some "content source". By contrast, "content source" refers to file contents that may need additional processing before being passed to Web application 110 or to a requesting computer system (e.g., 103).

For example, content source may comprise source code maintained in a file system or maintained separately from the file system, which must be separately compiled before it is passed to a requesting computer system 103. Content source, however, may also comprise simple text, which is not necessarily "compiled" in the conventional sense from source code. Content source that is simple text may merely be passed as generalized content to the Web application 110, and ultimately to the requesting computer system 103 where it is later potentially "interpreted" by another application program, or the like. In general, therefore, content that is stored in cache 125 will typically be processed "content", or content that is based at least in part on some other original "content source". On the other hand, information that is stored in a file system, or maintained by an application separately from the file system, is typically "content source", which is likely to need additional processing.

Accordingly, FIG. 1 also shows that the Web application 110 has access through virtual path providers 115 and 120 to content source maintained by Applications 135 and 140. Furthermore, Web application 110 also has access to file content source of remote computer Application 165 through virtual path provider 155. To retrieve generalized content, the requesting computer 103 sends a request 105 to the Web application 110 at the Web server 100, such as by sending a URI that includes reference to a file 137 on the file system 130 (or to file content not on the file system).

For example, FIG. 1 shows that the requested file 137 includes content source on the file system 130, such as application 133 file content source. File 137 also includes references to content source maintained by application 135, application 140, and application 165, which are not part of the file system (i.e., file system 130, or file system 170). As such, when the Web application 110 receives the request 105 for file 137, the Web application identifies that at least some of the requested content will require interfacing with one or more virtual path providers.

In general, a virtual path provider 115, 120, or 155 will be initiated when the respective application (e.g., 135, 140, 155) is started on the respective computer. For purposes of this specification and claims, the application can be any type of application that might be accessed through a Web application 110, including generic applications for handling web requests, databases, and the like. When the application is started, the application can choose to initiate a virtual path provider, or to use a generic file system provider. If the application intends to keep the files apart from the file system, the application initiates a virtual path provider.

The application then registers a handler, which allows the initiated virtual path provider to register with the respective computer system. For example, FIG. 1 shows that virtual path providers 115, 120, and 155 exist on computer system 100, and so would be registered thereon. One will appreciate that, although FIG. 1 shows a generally one-to-one relationship between virtual path providers and corresponding content, a one-to-one relationship is not required. For example, a virtual path provider can be initiated or registered with file content of several applications, in a many-to-one or one-to-many relationship. In any event, the Web application 110 will be able to identify an appropriate virtual path provider for requested content maintained separately from the file system of Web server 100.

Referring again to the request 105, the Web application 110 identifies one or more virtual path providers that have been initiated to access certain content source that is not a part of the file system. In one implementation, the Web application 110 asks a particular virtual path provider (e.g., virtual path provider 115) associated with certain content source (e.g., content source in Application 135 files) whether a virtual path included in the request is valid (e.g. is appropriate for the requested content source). The virtual path provider can then respond as described herein, or simply forward the request to another virtual path provider. For example, in one implementation, the virtual path provider might initially be the appropriate path provider, but may prefer to pass the request off to another virtual path provider for any number of reasons. In another implementation, the Web application 110 simply identifies the appropriate virtual path provider from a system registry of virtual path providers, and sends the corresponding request for content source.

In response to the request for content source, the virtual path provider can perform a number of determinations to ensure the Web application 110 provides content to the requesting computer system in an efficient manner. For example, in response to Web application 110, virtual path provider 115 can provide a hash of the content source, so that Web application 110 can check cache 125 to see if the requested contents exist in a valid cache entry. If the cache 125 contains a valid, up-to-date entry for the processed version of the requested contents, the Web application 110 can access the requested content from the cache entry at cache 125. By contrast, if the cache 125 does not contain a valid entry for the requested contents, the virtual path provider can also check to see if the file for the requested contents exists in the appropriate virtual path (e.g., "\virtualpath\App.135.files\filex"). If the file holding the corresponding content source (e.g., content of "filex") does not exist, the virtual path provider returns an error message to the Web server 110.

On the other hand, if the cache entry is not valid, but the file containing the requested contents does exist in the appropriate location, the virtual path provider simply gets the file from the virtual path (e.g., "/virtualpath/App.135.files/") provided in request 105, and opens the corresponding file. The virtual path provider then passes the file content source to the Web application 110, which in some cases can require the appropriate framework at the Web server 100 to compile any source code, as necessary. For example, content source of an ".aspx" file might need to be processed by an Active Server Page ("ASP.NET") framework (not shown) at the Web server 100.

The Web application 110 can then register a cache entry of the processed contents in a corresponding cache (e.g., cache 125), and get (and process) any remaining dependencies of content source from the corresponding virtual path provider. For example, the requested content source may contain additional references or incorporations of content source in the same virtual path, and hence not part of the file system. The content source would then be processed with the content source of the dependent files. Alternatively, if dependent files no longer exist, or are out of date, the virtual path provider may need to respond that the request for content source is invalid, since not all of the dependent (i.e., "referred to") content source for the request is available.

In any event, when the dependencies are available, the virtual path provider is configured to get the content source from all the appropriate files, including dependent content source, and pass the content source to the Web application 110 as a stream. The Web application 110, in turn, may implement an appropriate framework for any processing, and create a corresponding cache entry for the processed content source in cache 125. The Web application 110 subsequently passes the requested, processed contents to the requesting computer 103 as response 180. Accordingly implementations of the present invention allow a Web application to access content source that is in the file system and content source that is maintained separately from the file system (e.g., content maintained by a database or other application) in a similar manner, via abstraction through a virtual path provider.

Figure 2:
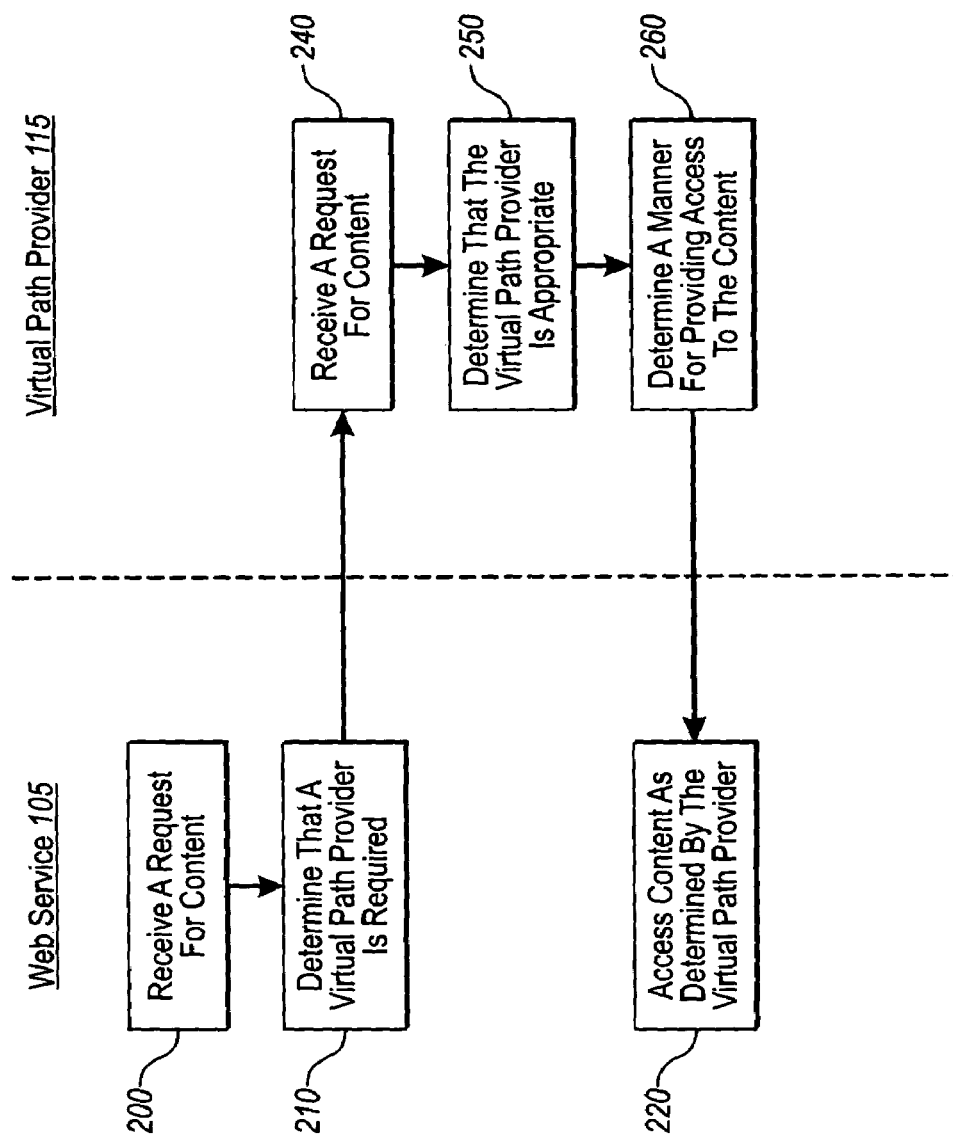
FIG. 2 illustrates a method from Web application and virtual path provider perspectives for providing content to a requesting computer system, where at least some of the content is based on content source that maintained separately from a file system.

The present invention can also be described in terms of acts of a method for accomplishing a result. In particular, FIG. 2 illustrates a block diagram of methods from the perspectives of the Web application 110 and from the perspective of a virtual path provider (e.g., 115, 120, or 155) when processing a request for content that is maintained separately from the file system 130 of Web server 100. The acts of these methods are discussed below with reference to FIG. 1.

For example, FIG. 2 shows that a method from the Web application 110 perspective comprises an act 200 of receiving a request for content. Act 200 includes receiving a request for content that is based at least in part on content source that is maintained separately from the file system. For example, Web application 110 receives request 105 from a requesting computer 103 for content, where at least a portion of the content is based on content source that is maintained by application 135.

The method also comprises an act 210 of determining that a virtual path provider is required. Act 210 includes determining that a virtual path provider provides access to the content source. For example, the Web application 110 can identify from a virtual path in the URI passed with the request 105 that at least some of the requested content is based on content source that is in a remote file system (e.g., 170), or otherwise accessible through a virtual path provider registered with an application, or initialed for use with the file system. Even if the file 137 contents are on the file system 130, the Web application 110 may further identify that the file 137 refers to at least some content source that is maintained by an application 135, which maintains content separately from the file system. As such, the Web application 110 identifies that a virtual path provider (e.g., virtual path provider 115 for application 135) is required to access at least some or all of the content source for the request 105.

Accordingly, FIG. 2 shows that the method from the perspective of the virtual path provider 115 comprises an act 240 of receiving a request for content. Act 240 includes receiving a request for content source that is maintained separately from a file system. For example, based on a system registry that associates the virtual path provider with specified application files, the Web application 110 requests content source associated with application 135 from the associated virtual path provider 115.

The method from the virtual path provider perspective 250 also comprises an act 250 of determining that the virtual path provider is appropriate. Act 250 includes determining whether the virtual path provider is appropriate for the content source based on a virtual path included in the request. For example, the virtual path provider identified by Web application 110 may have been inappropriately registered in the system registry with the virtual path of request 105, or the virtual path provider may want to pass the request to another virtual path provider out of a determination that the virtual path provider does not have the content source. Hence, for example, virtual path provider 115 simply forwards the request to virtual path provider 120, which may be more appropriate for the request under certain circumstances.

In addition, the method from the virtual path provider perspective comprises an act 260 of determining a manner for providing access to the content source. Act 260 includes determining a manner in which the Web application can access the content source, such that the Web application accesses a processed version of the content source from a cache entry based on a hash value determined by the virtual path provider, or such that the virtual path provider streams the content source to the Web application through the virtual path.

For example, the Web application 110 passes the virtual path received from the request 105 as an argument (e.g., "function(/virtualpath/App.140.files/)") to the virtual path provider 115. The virtual path indicates a physical location on storage (though not part of the file system), where the requested portion of content can be accessed. In one implementation, the virtual path provider 115 determines a hash value of the content source upon which some of the requested content is based, and provides the hash value to the Web application 110. The Web application 110 then compares the hash value with a cache entry in the cache 125. If there is a valid cache entry, the Web application 110 accesses the processed form of the content source from cache 125. Alternatively, the virtual path provider streams the content source on which the requested content is based to the Web application 110 through the virtual path.

Consequently, the method from the Web server perspective also comprises an act 220 of receiving content in a manner determined by the virtual path provider. Act 220 includes accessing the requested content in a manner determined by the virtual path provider, such that a processed form of the content is accessed through a cache entry, or such that the content source is received as a stream from the virtual path provider through the virtual path. For example, if the virtual path provider provides a hash of content source that indicates to the Web application 110 that there is no valid cache entry for a processed version of the content, the virtual path provider (e.g., 115) streams the relevant content source through the corresponding virtual path to (e.g., "/virtualpath/App.135.files/") Web application. Web application 110 then implements any appropriate processing for the content source streamed by the virtual path provider.

As such, any portion of content can still be part of a compilation process, even if the content was located in a virtual store that is maintained separately from a file system. As well, implementations of the present invention provide a number of ways in which a file system can be abstracted from the Web application 110, and such that files can be accessible to a Web application from any virtual store. Furthermore, implementations of the present invention are flexible enough to allow applications to choose instances in which maintaining files separately from the file system are preferred.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disc drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a Web application on a Web server in a computerized environment, the Web application receiving a request from a requesting computer system for processed content that is based at least in part on non-file-system content source that is maintained separately from a file system located at the Web server that is running the Web application, a method of providing the Web server with the ability to access the non-file-system content source in an efficient manner, and as if accessing content source on the file system at the Web server, the method comprising the acts of:

a Web application, receiving a request from a remote requesting computer system for a file that is maintained on a file system located at a Web server that receives the request, wherein the file contains content source and a reference to non-file-system content source, and wherein the request includes an identification of the file maintained on the file system located at the Web server, and an identification of a virtual directory path for the non-file-system content source;

determining that the file contains a reference to non-file-system content source that is maintained by an application separately from the file system, the non-file-system content being available through the virtual directory path in the request from the remote requesting computer system;

the Web application selecting, after receipt of the request, a virtual path provider, from a plurality of virtual path providers, to provide access to the non-file-system content source through the virtual directory path in the request from the remote requesting computer system;

the Web application accessing the non-file-system content source in a manner determined by the virtual path provider such that the non-file-system content source is received as a stream from the virtual path provider through the virtual directory path;

the Web application processing the content source with the non-file-system content source to produce the requested file; and storing the requested file as a cache entry in a cache maintained on the Web server.

2. The method as recited in claim 1 further comprising accessing the file stored in the cache in response to a subsequent request for the file.

3. The method as recited in claim 1, wherein identifying a virtual path provider to provide a virtual directory path for accessing the non-file-system content source comprises identifying a virtual path from the request for the file, and identifying that the virtual path provider is associated with the virtual path.

4. The method as recited in claim 1 further comprising accessing the file maintained by the file system through a virtual path provider.

5. The method as recited in claim 1, wherein identifying a virtual path provider to provide a virtual directory path for accessing the non-file-system content source comprises identifying a virtual path provider for the non-file-system content source through a system registry.

6. The method as recited in claim 1, wherein accessing the non-file-system content source in a manner determined by the virtual path provider further comprises receiving a stream of the content source from a different virtual path provider based on a determination by a first virtual path provider that the different virtual path provider is more appropriate.

7. The method as recited in claim 6, wherein the determination by the first virtual path provider is based on a determination by the first virtual path provider that the first virtual path provider cannot access the non-file-system content source.

8. The method as recited in claim 1, wherein the request from the requesting computer system comprises a URI that refers to the file that references the non-file-system content source.

9. The method as recited in claim 1, wherein the non-file-system content source that is maintained separately from the file system resides in a virtual store at a computer system that is different from the Web server on which the Web application resides.

10. At a Web application operating in connection with a Web server in a computerized environment, the Web application receiving a request from a requesting computer system for processed content that is based at least in part on non-file-system content source that is maintained separately from a file system located at the Web server, a method of providing the Web server with the ability to access the non-file-system content source in an efficient manner, and as if accessing content source on the file system at the Web server, the method comprising the acts of:

receiving, at a Web server, a request from a remote requesting computer system for a file that is maintained separately from a file system located at a Web application, wherein the file contains content source and a reference to non-file-system content source, and wherein the request includes an identification of the file maintained on the file system located at the Web server, and an identification of a virtual directory path for the non-file-system content source;

determining that the file contains a reference to non-file-system content source that is maintained by an application separately from the file system, the non-file-system content being available through the virtual directory path in the request from the remote requesting computer system;

after receiving the request, determining whether a first virtual path provider is appropriate for accessing the non-file-system content source using the virtual directory path in the request from the remote requesting computer system, and when the first virtual path provider is not appropriate, identifying a second virtual path provider that is appropriate for accessing the non-file-system content source, using the virtual directory path in the request from the remote requesting computer system;

the Web server accessing the non-file-system content source in a manner determined by the second virtual path provider, so that the non-file-system content source:

i) is received as a stream from the second virtual path provider through a virtual path when the server determines that a hash value provided by the second virtual path provider does not match a hash of any content entry stored in a cache maintained on the Web server; and ii) is accessed through a cache entry in the cache maintained on the Web server when the hash value provided by the virtual path provider does match a hash value of the cache entry stored in the cache maintained on the Web server; and the Web application processing the content source with the non-file-system content source to produce the requested file.

11. The method as recited in claim 10, wherein the requested file also refers to content source that is maintained by the file system located at the Web application, the method further comprising providing a stream to the requesting computer system of the content source maintained by the file system located at the Web application.

12. The method as recited in claim 11, further comprising:

generating the hash value from the content source that is maintained by the file system located at the Web application; and providing the hash value to the Web application, such that the Web application uses the hash value to identify whether the cache entry is valid.

13. The method as recited in claim 12, wherein the Web application identifies that the cache entry is invalid based on the provided hash value of the content source, the method further comprising identifying that a file associated with the content source exists.

14. The method as recited in claim 13, further comprising streaming the content source through the virtual path.

15. The method as recited in claim 12, wherein the non-file-system content source that is maintained separately from the file system resides on a computer system that is different from the Web server on which the Web application resides.

16. The method as recited in claim 15, wherein the content source that is maintained by the file system located at the Web application is maintained on a file system of another computer system that is different from the Web server.

17. A computer program product that includes computer-readable storage media, having stored thereon computer-executable instructions that, when executed by a processor, cause one or more computing systems to perform the method of claim 10.

18. At a Web application on a Web server in a computerized environment, the Web application receiving a request from a requesting computer system for processed content that is based at least in part on non-file-system content source that is maintained separately from a file system located at the Web server that is running the Web application, a method of providing the Web server with the ability to access the non-file-system content source in an efficient manner, and as if accessing content source on the file system at the Web server, the method comprising the acts of:

a Web application, receiving a URL request from a remote requesting computer system for a Web form that is maintained on a file system located at a Web server that receives the URL request, wherein the Web form includes content source and at least one reference to non-file-system content source stored in a database, and wherein the URL request includes an identification of the Web form maintained on the file system located at the Web server, and an identification of a virtual directory path for accessing the non-file-system content source in the database;

determining that the file contains the at least one reference to the non-file-system content source in the database, the non-file-system content source being maintained by a database separate from the file system, the non-file-system content source being available through the virtual directory path in the request from the remote requesting computer system;

the Web application selecting, after receipt of the URL request, a virtual path provider, from a plurality of virtual path providers, to provide access to the non-file-system content source through the virtual directory path in the request from the remote requesting computer system, wherein selecting includes automatically accessing a system registry of the plurality of virtual path providers, the system registry of virtual path providers relating virtual directory paths to particular virtual path providers;

the Web application receiving, from the selected virtual path provider, a hash value corresponding to the non-file-system content;

the Web application comparing the hash value against cache entries maintained in a cache on the Web server, and determining that the hash value does not match any cache entries stored in the cache;

after determining that the hash value does not match any cache entries stored in the cache, the Web application accessing the non-file-system content source in a manner determined by the virtual path provider such that the non-file-system content source is received as a stream from the virtual path provider through the virtual directory path, and without scripts for querying the database;

the Web application processing the content source with the non-file-system content source to produce the requested file;

storing the requested file as a cache entry in a cache maintained on the Web server; and after receiving the non-file-system content as a stream from the virtual path provider, processing dependent entries of the Web form, and receiving content source corresponding to the dependent entries through a plurality of virtual path providers.

\* \* \* \* \*